United States Patent [19]

New, Jr.

[11] Patent Number: 4,874,284
[45] Date of Patent: Oct. 17, 1989

[54] KIT FOR TRANSPORTING ALL TERRAIN VEHICLES

[76] Inventor: James Truitt New, Jr., P.O. Box 1421, Wimberley, Tex. 78676

[21] Appl. No.: 128,072

[22] Filed: Dec. 3, 1987

[51] Int. Cl.$^4$ ............................................. B65G 67/02
[52] U.S. Cl. ..................................... 414/537; 14/69.5
[58] Field of Search ............... 414/537, 538, 571, 430, 414/480; 14/69.5; 224/309, 329, 42.32, 42.03, 42.43, 42.44, 42.45 R, 42.46 R

[56] References Cited

U.S. PATENT DOCUMENTS

| | | | |
|---|---|---|---|
| 3,352,440 | 11/1967 | Wilson | 414/537 |
| 3,510,015 | 5/1970 | Roshaven | 414/537 |
| 3,517,791 | 6/1968 | Miles | 414/537 X |
| 3,756,440 | 9/1973 | Raap et al. | 414/537 |
| 3,757,972 | 9/1973 | Martin | 414/537 |
| 3,977,545 | 8/1976 | Lloyd | 414/537 |
| 4,668,002 | 5/1987 | Hanson | 414/537 X |
| 4,761,847 | 8/1988 | Savage et al. | 414/537 X |

Primary Examiner—Frank E. Werner
Assistant Examiner—Robert S. Katz
Attorney, Agent, or Firm—David G. Henry

[57] ABSTRACT

A kit for adapting a pickup truck for safely loading, transporting, and unloading two all terrain vehicles over the truck's bed area while preserving cargo space in the bed area. The kit includes a platform having a frame and flooring with dimensions sufficient to park two standard size all terrain vehicles thereon with the vehicles facing perpendicular to the length of the truck. The platform is mounted on the sidewalls of the truck such that the flooring is approximately even with the tops of the sidewalls, thus preserving significant cargo space under the flooring. Because it is safer when moving all terrain vehicles on a incline to always travel forward, the kit is designed for loading the vehicles on one side of the platform and unloading on the other. Toward this end, the kit's safety barrier, which is for preventing vehicles being loaded from one side from being accidentally driven off the other side, is hingedly attached and may be lowered and passed over while unloading vehicles. Likewise, means for attaching the kit's two loading ramps to the platform are positioned in two paired positions on each side of the platform. The loading ramps are collapsible for transportation in the bed of the truck.

1 Claim, 2 Drawing Sheets

KIT FOR TRANSPORTING ALL TERRAIN VEHICLES

BACKGROUND OF THE INVENTION

The present invention relates primarily to most efficiently using a pickup truck for transporting all terrain vehicles (ATVs).

In recent years, ATVs have become the primary source of family recreation for many families in the United States. It is estimated that 30,000 ATVs have been sold in the State of Texas alone since 1984.

Most persons owning ATVs who transport them to remote riding sites do so using a pickup truck. Most pickup truck beds will only hold one ATV; therefore, if more than one person in any one pickup truck wants to have an ATV transported, a trailer must be used for any ATVs in excess of one.

The ability to transport two ATVs for any one pickup truck would, for many persons, eliminate the need for a trailer in transporting ATVs. For persons transporting more than two ATVs, such ability will at least reduce the size of the necessary trailer, or in the alternative, simply increase the number of ATVs that any one person already having a trailer may transport. The objective of the present invention is to provide means whereby two ATVs may be transported by one pickup truck. Further, the present invention provides means for easily loading and unloading ATVs for transportation and for reserving cargo space in the bed of the pickup for carrying additional items.

SUMMARY OF THE INVENTION

The present invention teaches a kit having a platform to be mounted on the side walls of a pickup truck bed which provides a flat surface just above the level of the top of the side walls on which ATVs may be carried. Connection sites for collapsible ramps are provided on two of the four opposing sides of the platform, the two which will be situated parallel with the sides of the pickup truck when the platform is installed. This permits loading ATV's at one side of the platform and unloading from the other. A hinged and lockable safety barrier is incorporated into one of these two sides, and is intended to prevent accidents involving "over shooting" the edge of the platform when loading an ATV.

DETAILED DESCRIPTION OF THE PREFERRED EMBODIMENT

The present invention teaches a kit for adapting a pickup truck for safely loading, transporting and unloading two all terrain vehicles (ATVs) while preserving cargo space in the pickup bed.

Figure 1:
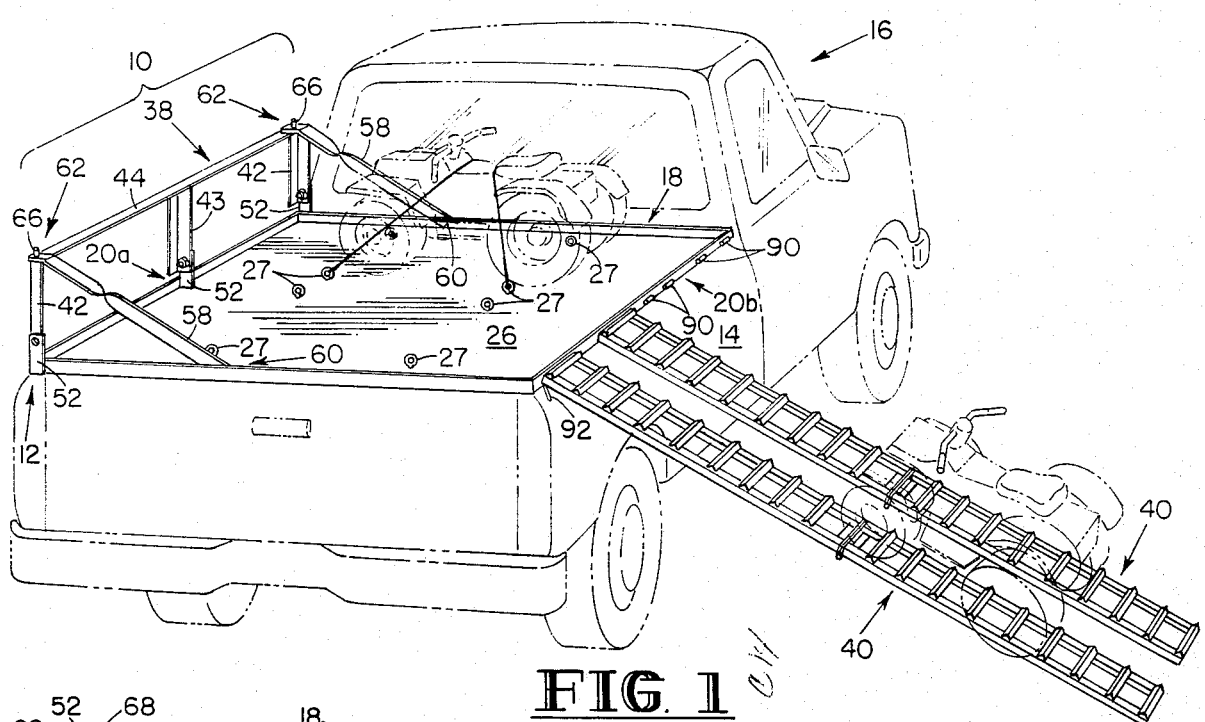
FIG. 1 is a perspective view of the preferred embodiment installed for use on a pickup truck with one ATV on the platform and one ATV being loaded onto the platform.
Figure 2:
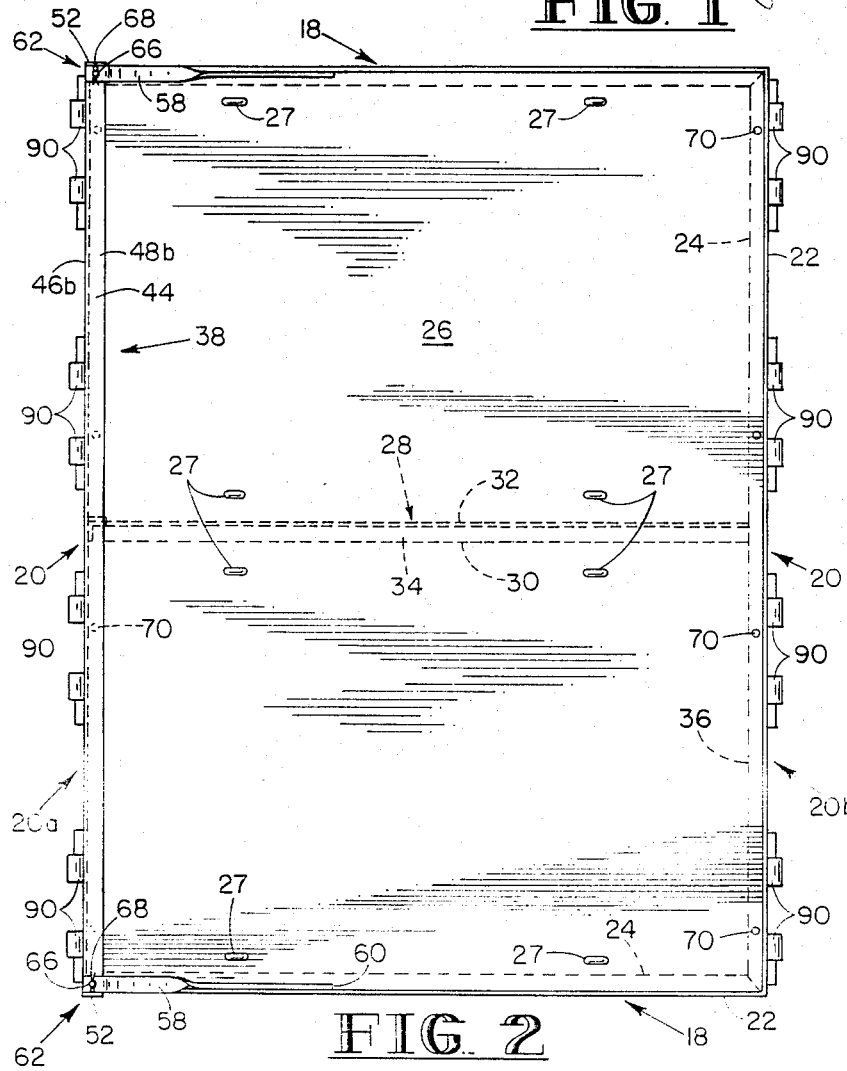
FIG. 2 is a top land view of the platform portion of the preferred embodiment.

Referring to FIGS. 1 and 2, the kit is referred to in its entirety by the reference numeral 10. The kit 10 includes a platform frame 12 which attaches to the side walls 14 of a pickup truck 16. The pieces of the platform frame 12 are made from $1'' \times 1'' \times \frac{1}{8}''$ angle iron. The short sides 18 of the platform frame 12 are 48 inches in length and the long sides 20 are 70 inches in length. The long and short sides 20 and 18 each have a vertical lip 22 and a horizontal lip 24. The long sides 20 and the short sides 18 are joined at the four corners of the platform frame 12 in such a way that the vertical lips 22 are continuous around the perimeter of the platform frame 12 as are the horizontal lips 24. The ends of each horizontal lip 24 are cut at an angle (usually a 45 degree angle for simplicity's sake) in order to correctly mate with an adjoining horizontal lip 24 of a long side 20 or a short side 18 as the case may be.

To provide stability for the platform frame 12 and to give added support for the flooring 26 upon which the ATV's will rest, a floor brace 28 is attached to the long sides 20 at or near their mid-points. The floor brace 28 of the preferred embodiment is made from angle iron like that of the long and short sides 20 and 18. The floor brace 28 has a floor lip 30 which lies in the horizontal plane and a support lip 32 which lies in the vertical plane. The outer face 34 of floor lip 30 is attached at the ends of the floor brace 28 to the outer face 34 of the long sides' 20 horizontal lips 24 by welding. This arrangement requires that the support lip 32 be directed oppositely from the vertical lips 22 of the long and short sides 20 and 18 which, in turn, permits the platform flooring 26 to lie flat while being supported jointly by the horizontal lips 24 of the long and short sides 20 and 18 and by the floor lip 30 of the floor brace 28.

Figure 3:
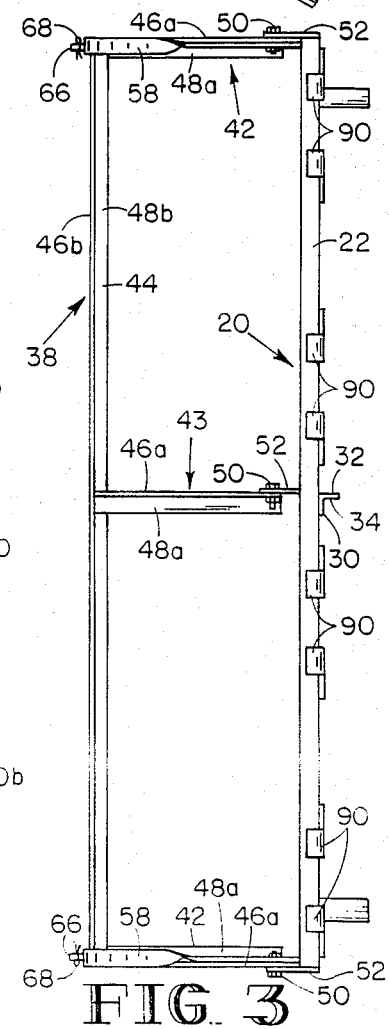
FIG. 3 is a left elevational view of the preferred embodiment with the safety barrier in the raised position.
Figure 4:
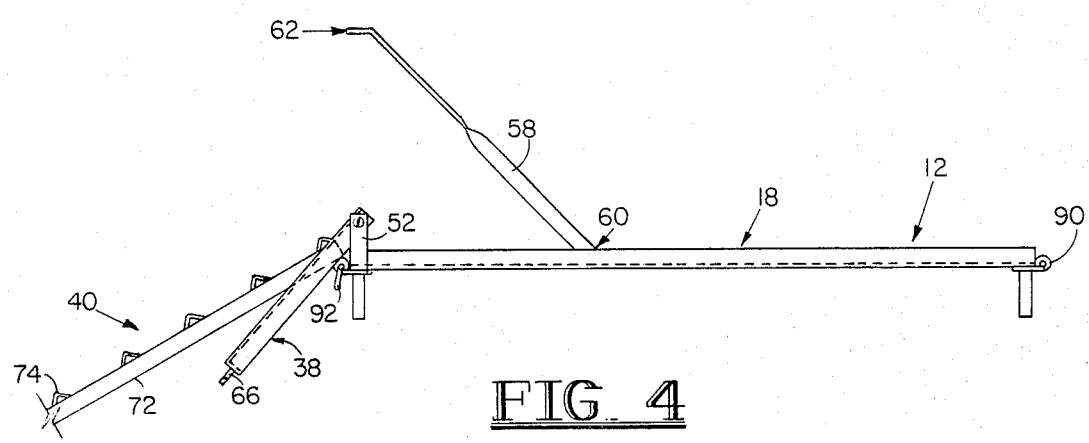
FIG. 4 is a rear elevational view of the preferred embodiment with the safety barrier in the lowered position and a ramp connected to the platform for unloading an ATV.

Referring to FIGS. 2 and 3, a safety barrier 38 is attached at the first long side 20a. The purpose of the safety barrier 38 is to prevent an ATV which is being loaded onto the platform at the second long side 20b from being inadvertently driven over the edge of the platform at the first long side 20a. Without the safety barrier 38, such an accident is quite possible because a considerable amount of the ATV's power is used in climbing the ramps 40 which power may inadvertently not be reduced quickly enough when the ATV reaches the level platform.

The safety barrier's 38 pivotal attachment to the platform frame 12 addresses another safety concern. Through experience, it has been determined that there is a substantial likelihood of an ATV moving in a rearward and downward direction overturning if the ATV's brakes are applied suddenly. This is not a substantial danger if the ATV only travels forward because the majority of an ATV's weight is in the rear where the engine is located. The safety barrier's hinged attachment permits it to be lowered so an ATV may be driven over the first long side 20a and forward down the ramps 40 which will have been moved from the second long side 20b to the first long side 20a for unloading.

More specifically relating to structure, the safety barrier 38 is constructed of $1'' \times 1'' \times \frac{1}{8}''$ angle iron and comprises two side pieces 42, a middle piece 43, and a cross piece 44. The side and middle pieces 42 and 43 are approximately 18 inches in length and the cross piece 44 is approximately 69.75 inches in length. The cross piece 44 and the side pieces 42 are welded together to form three sides of a rectangle. The one end of the middle piece 43 is welded to the cross piece 44 at its midpoint and is oriented parallel with the side pieces 42. The side pieces 42, the middle piece 43, and the cross piece 44 are positioned so when the safety barrier 38 is connected to the platform frame 12, the perimeter lips 46a of the side and middle pieces are oriented parallel with the vertical lips 22 of the short sides 18, the perimeter lip 46b of the cross piece 44 lies in the horizontal plane at the top of the barrier 38, and the facial lips 48a of the side and middle pieces 42 and 42, as well as the facial lip 48b of the cross piece 44, lie in the same vertical plane parallel with the horizontal lips 24 of the short and long sides 18 and 20. The side and middle pieces 42 and 43 each have a hole (not visible in the drawings) passing through the perimeter lip 46a situated approximately 1 inch from their ends which are closest to the open side of the aforementioned rectangle. The holes are each for receiving a bolt 50 about which the side and middle pieces 42 and 43 may pivot thereby allowing the safety barrier 38 to be lowered.

The side and middle pieces 42 and 43 are attached to the platform frame 12 by way of hinge brackets 52. The hinge brackets 52 are pieces of $1'' \times \frac{1}{8}''$ metal approximately 5 inches in length with a hole (not visible in the drawings) passing through its broad sides approximately 1 inch from its first end. The second end of the hinge brackets 52 for the side pieces 42 are attached by welding to the vertical lip 22 of one of the short sides 18 immediately adjacent to the first long side 20a. The second end of the hinge bracket 52 for the middle piece 43 is attached by welding to the support lip 32 of the floor brace 28 immediately adjacent to the first long side 20a. For each side piece 42/hinge bracket 52 combination and for the middle piece 43/hinge bracket 52 combination, a bolt 50 passes through the two members. The bolt 52 is held in place by a nut 56 and lock washer (not shown).

To sustain the safety barrier 38 in its raised position against force which may be applied against it, barrier braces 58 are provided. The barrier braces of the preferred embodiment are $1'' \times \frac{1}{8}''$ flat metal strips approximately 10 inches in length. The barrier braces 58 are attached at their first ends 60 to the vertical lips 22 of the short sides 18 by welding. The barrier braces 58 are twisted 90 degrees at some point along their lengths so that the broad sides of the barrier braces 58 are horizontally oriented at the barrier braces' 58 second ends 62. A hole 64 passes through each of the barrier braces 58 near their second ends 62. The placement of the barrier braces 58 and their orientation relative to the short sides 18 are such that the second ends 62 superpose the perimeter lip 46b of the safety barrier 38 when the safety barrier 38 is raised. A stud 66 sized for passing through the hole 64 in each barrier brace 58 is attached to the outer face of the perimeter lip 46b of the cross piece 44 near each of the cross piece's 44 ends. When the studs 66 pass through the holes 64 in the respective barrier braces 58, the engagement between the barrier braces 58 and the safety barrier 38 is secured by a cotter key 68.

Referring again to FIGS. 1 and 2, the flooring 26 for a kit 10 having the dimensions thus far disclosed would be approximately 47.5 inches by 69.5 inches in size. Flooring 26 having these dimensions will be supporting at its perimeter by the horizontal lips 24 of the long and short sides 20 and 18 as well as by the floor lip 34 of the flooring brace 28. The flooring 26 of the preferred embodiment comprises one sheet of $\frac{3}{4}$ inch Grade A plywood. Alternatively, two or more sheets of plywood, or some other acceptable material, compositely having the necessary dimensions may be used.

So that vehicles once in position may be secured on the flooring 26 during transportation, tie-down eyes 27 are provided at appropriate locations on the flooring 26. The particular position of the tie-down eyes 27 may be varied for different types of vehicles to be transported.

The kit 10 is attached to the truck 16 by bolts 70 which pass through holes (not visible in the drawings) in the horizontal lips 24 of the long sides 20 and then through holes which are drilled through the tops of the sidewalls 14 of the pickup truck 16. The bolts 70 are secured by lock washers and nuts (not visible in the drawings) affixed on the underside of the metal constituting the tops of the sidewall 14 tops of the pickup truck 16. Welding the long sides 20 directly to the tops of the pickup truck's 16 sidewalls 14 would be an acceptable alternative, although not permitting the kit 10 to be readily transferred to some other truck.

Referring primarily to FIGS. 1, 5, 6, 7A, and 7B, the kit 10 includes two collapsible ramps 40 for loading and unloading ATV's. Each ramp 40 consists of two spans which are hingedly connected together. Each span is made of two $1'' \times 2''$ box metal pieces 72 which are approximately 5 feet in length and connected by a plurality of cross members 74 made from $1'' \times 1'' \times \frac{1}{8}''$ angle iron. The cross members 74 are welded to corresponding first 1" sides 76a of the box metal pieces 72 so that their apices are directed away from the box metal pieces 72. The cross members 74 are approximately 12 inches in length making the separation of the first 2" faces 78a of the box metal pieces 72 approximately 10 inches.

Figure 7A:
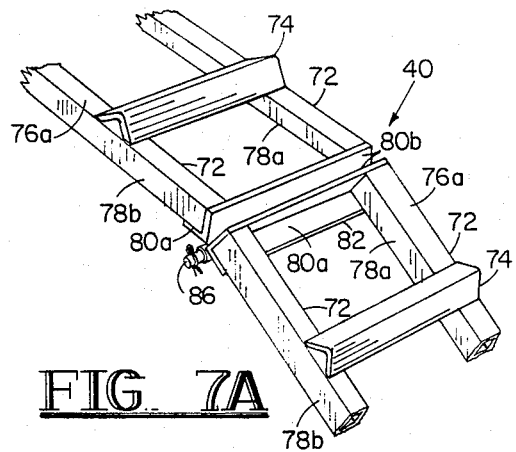
FIG. 7A is a top perspective view of the center portion of a ramp of the preferred embodiment.
Figure 7B:
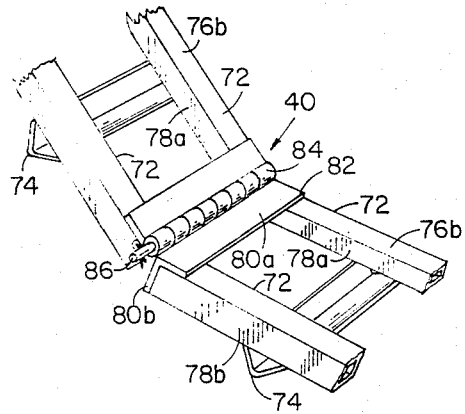
FIG. 7B is a bottom perspective view of the center portion of a ramp of the preferred embodiment.

Referring specifically to FIGS. 7A and 7B, at the interior end of each span of each ramp 40, the first 2" lip 80a of an abutment plate 82 formed from a piece of $2'' \times 2'' \times \frac{1}{8}''$ angle iron approximately 12 inches in length is welded to the second 1" face 76b of the box metal pieces 72 with the second 2" lip being welded across the open ends of the box metal pieces 72. A ramp hinge cylinder 84 is welded at each end of each second 2" lip 80b of each abutment plate 82. The ramp hinge cylinders 84 are arranged on the second 2" lips 80b in a mating arrangement whereby a pin 86 can pass through the ramp hinge cylinders 84 of the two second 2" lips 80b and thereby hingedly connect the spans of the ramps 40. The ramp hinge cylinders 84 are further placed so the second 2" faces 80b can contact each other over their entire surfaces. This arrangement provides stability for the ramps 40 at their mid-points.

Figure 5:
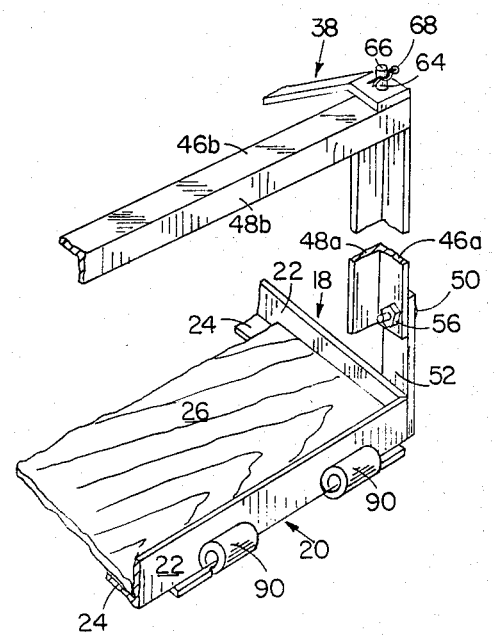
FIG. 5 is a partial perspective cut away view of a portion of the preferred embodiment showing frame connecting cylinders and a portion of the safety barrier and a safety barrier support member.
Figure 6:
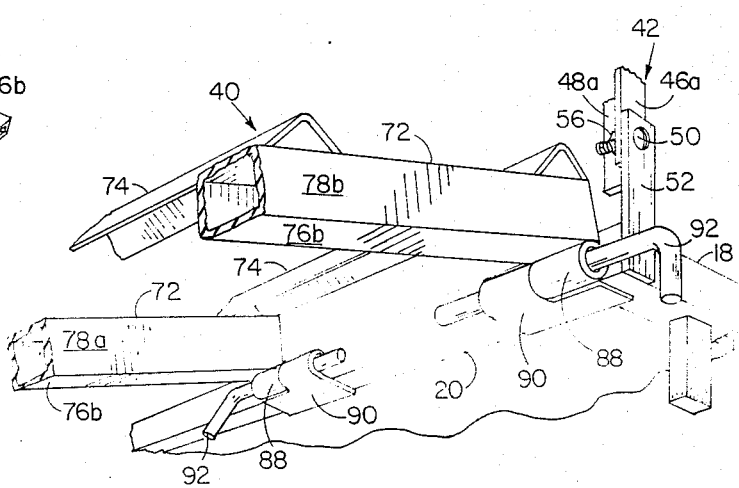
FIG. 6 is a partial perspective cut away view of a portion of the preferred embodiment showing the means by which the ramps are connected to the frame of the preferred embodiment.

Referring specifically to FIG. 6, a ramp connecting cylinder 88 is welded to the second 1" face 76b of each box metal piece 72 at a terminal end of each ramp 40. Eight substantially identical frame connecting cylinders 90 arranged in four pairs are welded to the outside face of the vertical lip 22 of each long side 20 immediately adjacent to the convergence of the vertical lip 22 and the horizontal lip 24. The frame connecting cylinders 90 are oriented parallel with the length of the long sides 20. Each pair of frame connecting cylinders 90 are positioned relative to each other so they may juxtapose the ramp connecting cylinders 88 on the ramps 40. This arrangement permits the ramps 40 to be connected with the frame 12 by passing a pin 92 through each ramp connecting cylinder 88 of each ramp and into a corresponding frame connecting cylinder 90 on one of the long sides 20. As shown in FIG. 5, the outermost frame connecting cylinders 90 on each long side 20 are positioned substantially adjacent to the outer edges of the frame 12. Frame connecting cylinders 90 are placed on both long sides 20 so that the ramps 40 may be attached to the first long side 20a for loading an ATV and to the second long side 20b for unloading.

An alternative embodiment for the ramps 40 would include a lip (not shown in Figures) at an end of the ramp 40 which otherwise would have the ramp connecting cylinders 88 as shown in FIG. 6. The lip would be formed by welding one lip of a piece of 2"×2"×⅛" angle iron to the second 1" face 76b of the box metal pieces 72, with the other lip directed away from the box metal pieces 72. The ramp 40 would be engaged with the platform frame 12 by merely hooking the extended lip over the vertical lip 22 of the appropriate long side 20. It is believed that this alternative embodiment has utility, however, it is not as safe as the preferred embodiment described above because it does not provide as secure a coupling between the ramps 40 and the platform frame 12 as the preferred embodiment.

It is noted that the length of the ramp spans is dictated by the need to have the ramps 40 at a gradual enough slope for an ATV to be able to climb the ramps 40 under their own power when the end of the ramp 40 having the ramp connecting cylinders 88 is connected to the platform frame 12 and the other end of the ramp 40 rests on the ground.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A kit for adapting a pickup truck for safely loading, transporting, and unloading two all terrain vehicles on a platform over said truck's bed area while preserving cargo space in said bed area comprising:

a platform frame, rectangular in shape and having dimensions approximately equal to dimensions of said truck bed, said platform frame being made from angle iron and having first and second short sides each with first and second short side ends and first and second long sides each with first and second long side ends, said short sides and said long sides being joined together at right angles whereby a vertical long side lip of each said long side which lies perpendicular to the plane defined by said frame joins with a like-oriented vertical short side lip of each said short side and a horizontal long side lip of each said long side which is oriented parallel with said plane joins with a like-oriented horizontal short side lip of each said short side, said horizontal long side lip of said first and second long sides having holes sized for allowing bolts to pass therethrough to engage said platform frame with side walls of said bed, said platform frame to be attached to said side walls whereby said vertical long side lips and said vertical short side lips extend away from said bed;

a platform floor having dimensions for residing within a boundary defined by said vertical long side lips and said vertical short side lips while being supported by said horizontal long side lips and said horizontal short side lips;

first and second hinge brackets made from metal strips each having first and second hinge bracket ends, said first ends of said first and second hinge brackets being respectively attached to said vertical short side lip of a first said short side and to said vertical short side lip of a second said short side adjacent to said first and said second short sides' connection with said first long side, said first and second hinge brackets each having a hole near said second hinge bracket end for allowing a bolt to pass therethrough;

a safety barrier to prevent said vehicles from being accidentally driven off of said platform during loading, said safety barrier being constructed of angle iron, said barrier comprising first and second side pieces approximately eighteen inches in length, each having first and second side piece ends, said barrier further comprising a cross piece having first and second cross piece ends and being approximately ½ inch shorter in length that said long sides, said first and second side pieces and said cross piece being connected to form three sides of a rectangle with said first and second side pieces' first side piece ends being respectively connected with said first and second cross piece ends, said second side piece ends each having a second hole passing therethrough for allowing a bolt to pass through each said side piece and thereafter to pass through said first hole of said hinge bracket to hingedly couple said safety barrier with said frame in a manner to allow said safety barrier be lowered and raised;

first and second threaded studs attached to said cross piece adjacent respectively to said first ends of said first and second side pieces and extending outward from said cross piece parallel with said side pieces;

first and second safety barrier braces each having first and second brace ends, said safety barrier braces being made from strips of metal, said first brace ends of said first and second safety barrier braces being respectively attached to said first and second short sides on their said vertical short side lips at positions and in orientations whereby said second brace ends respectively reach said first and second threaded studs when said safety barrier is in a raised position, said safety barrier braces each having a third hole near their said second safety barrier ends sized for allowing said threaded studs to pass therethrough to couple said safety barrier with said braces;

first and second ramps for loading said vehicles, said ramps each having first and second ramp connecting cylinders attached at an end of each said ramp on either side of said ramp, said ramps comprising two spans hingedly connected whereby said ramps may be changed between an extended usable configuration and a collapsed transportation/storage configuration;

first, second, third, and fourth pairs of frame connector cylinders mounted on said vertical long side lips of said first and said second long sides, said frame connector cylinders of each said pair being relatively positioned whereby said ramp connector cylinders of either of said ramps may juxtapose said frame connector cylinders of any said pair so a pin may be used to couple said ramp connector cylinders with said frame connector cylinders, said first and fourth pairs being positioned respectively adjacent to said first and second long side ends of said first and second long sides and said second and third pairs being positioned relative to said first and fourth pairs whereby ramps connected to said first and second pairs are properly spaced for driving said vehicle thereon and whereby ramps connected to said third and fourth pairs are properly spaced for driving said vehicle thereon;

said kit when installed providing means for loading said vehicles on said truck while persevering cargo space in said bed area, providing means for loading said vehicles on said platform and unloading said vehicles from said platform by driving said vehicles forward under their own power in a forward direction, and providing a barrier for preventing said vehicles from being accidentally driven over said first long side during loading from said second long side.

* * * * *